(12) United States Patent
MacInnis

(10) Patent No.: US 8,553,155 B2
(45) Date of Patent: Oct. 8, 2013

(54) SYSTEM AND METHOD FOR THREE DIMENSIONAL COMB FILTERING

(75) Inventor: Alexander G. MacInnis, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 3372 days.

(21) Appl. No.: 10/794,858

(22) Filed: Mar. 5, 2004

(65) Prior Publication Data

US 2004/0174465 A1  Sep. 9, 2004

Related U.S. Application Data

(60) Provisional application No. 60/452,273, filed on Mar. 5, 2003, provisional application No. 60/492,680, filed on Aug. 5, 2003.

(51) Int. Cl.
*H04N 9/78* (2006.01)
*H04N 9/77* (2006.01)
*H04N 5/21* (2006.01)

(52) U.S. Cl.
USPC ........... 348/665; 348/609; 348/666; 348/667; 348/180; 382/275

(58) Field of Classification Search
USPC ......... 348/180, 662, 609, 663–670, 713, 712; 382/260, 261, 275
See application file for complete search history.

(56) References Cited

U.S. PATENT DOCUMENTS

| | | | | |
|---|---|---|---|---|
| 4,651,196 A | * | 3/1987 | Harwood et al. | 348/667 |
| 4,974,065 A | * | 11/1990 | Murakami et al. | 348/668 |
| 5,006,927 A | * | 4/1991 | Creed et al. | 348/665 |
| 5,027,194 A | * | 6/1991 | Scheffler | 348/609 |
| 5,140,410 A | * | 8/1992 | Shin | 348/669 |
| 5,225,899 A | * | 7/1993 | Park | 348/665 |
| 5,305,120 A | * | 4/1994 | Faroudja | 348/624 |
| 5,448,305 A | * | 9/1995 | Hagino | 348/665 |
| 5,483,294 A | * | 1/1996 | Kays | 348/609 |
| 5,500,687 A | * | 3/1996 | Hatano et al. | 348/663 |
| 5,517,255 A | * | 5/1996 | Gai et al. | 348/663 |
| 5,583,579 A | * | 12/1996 | Shim | 348/668 |
| 5,585,861 A | * | 12/1996 | Taniguchi et al. | 348/669 |
| 5,663,771 A | * | 9/1997 | Raby | 348/663 |

(Continued)

OTHER PUBLICATIONS

Shin-etsu Ito; "A study of Digital Y/C Separation in NTSC or PAL Color Television;" IEEE 1994; pp. 963-968.

(Continued)

*Primary Examiner* — Jefferey Harold
*Assistant Examiner* — Jean W Desir
(74) *Attorney, Agent, or Firm* — Thomas | Horstemeyer, LLP.

(57) ABSTRACT

A system and method for improved comb filtering. Various aspects of the present invention may comprise method steps and system components that generate a signal indicative of the quality of a field-combed signal. A first signal indicative of inter-field and inter-line signal difference substantially inside the chroma frequency band may be generated. An indication of field comb quality may be determined based at least in-part on the first signal, and a corresponding signal may be generated. Various aspects of the present invention may comprise method steps and system components that generate a comb-filtered signal. A field comb signal and line comb signal may be generated. A comb-filtered signal may be generated based on the field comb signal, line comb signal, and the signal indicative of the field comb quality.

20 Claims, 8 Drawing Sheets

(56) References Cited

U.S. PATENT DOCUMENTS

| | | | |
|---|---|---|---|
| 5,786,872 A * | 7/1998 | Miyazaki et al. | 348/669 |
| 5,870,153 A * | 2/1999 | Murray et al. | 348/667 |
| 6,175,389 B1 * | 1/2001 | Felts et al. | 348/663 |
| 6,278,495 B1 * | 8/2001 | Lowe et al. | 348/665 |
| 6,384,873 B1 * | 5/2002 | Rumreich et al. | 348/666 |
| 6,504,579 B1 * | 1/2003 | Scherrer | 348/667 |
| 6,674,488 B1 * | 1/2004 | Satoh | 348/663 |
| 6,774,954 B1 * | 8/2004 | Lee | 348/665 |
| 6,809,778 B2 * | 10/2004 | Shibutani et al. | 348/667 |
| 6,903,781 B2 * | 6/2005 | Tanigawa et al. | 348/565 |
| 6,914,638 B2 * | 7/2005 | Tsui | 348/663 |
| 6,950,149 B1 * | 9/2005 | Goseki | 348/667 |
| 6,995,804 B2 * | 2/2006 | Kwon et al. | 348/663 |
| 6,999,130 B2 * | 2/2006 | Tanigawa | 348/663 |
| 7,092,038 B2 * | 8/2006 | Shih et al. | 348/663 |

OTHER PUBLICATIONS

Daeyun Shim, Junmo Jung, Jongsang Yim, Taehyung Lee, Jungsang Lee, Yunbok Shin, Y.C. Jeung, J.H. Lee; "An Advanced 2 Dimensional Y/C Separation and Y/C Processing VLSI for NTSC Composite Video Signal;" IEEE 1992; pp. 256-257.

Shin-etsu Ito, Robert Lowlor, Norio Ebihara; "Development of a Crosstalk Measurement Type Three-dimensional Digital Color Decoder;" IEEE 1993; pp. 63-70.

* cited by examiner

SYSTEM AND METHOD FOR THREE DIMENSIONAL COMB FILTERING

CROSS-REFERENCE TO RELATED APPLICATIONS/INCORPORATION BY REFERENCE

This patent application claims the benefit of U.S. Provisional Application No. 60/452,273, filed Mar. 5, 2003, titled "SYSTEM, METHOD AND APPARATUS FOR 3-DIMENSIONAL COMB FILTERING," the contents of which are hereby incorporated herein by reference in their entirety. This patent application also claims the benefit of U.S. Provisional Application No. 60/492,680 filed Aug. 5, 2003, titled "SYSTEM AND METHOD FOR 3-DIMENSIONAL COMB FILTERING," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Various signal processing systems may utilize comb filtering, which generally refers to signal processing that separates signals with spectra that are interleaved in the frequency domain in a frequency spectral pattern that may resemble teeth of a comb. For example, video processing systems may utilize comb filtering to separate chroma information from luma information in composite video signals.

Various systems and methods exist for comb filtering, including two-dimensional and three-dimensional comb filtering. Two-dimensional comb filtering may include, for example, performing comb filtering on a current video signal and another video signal from the same video field as the current video signal. Two-dimensional comb filtering may, for example, process a current video signal from a current video line with a second signal from a video line in the same video field that is vertically adjacent to the current video line and that corresponds horizontally to the current video signal. Such filtering may also be referred to as line combing. Three-dimensional comb filtering may include, for example, performing comb filtering on a current video signal from a current video field and another video signal from a different video field. Such filtering may also be referred to as frame combing or field combing.

In video processing systems that utilize two-dimensional and three-dimensional comb filtering, various phenomena in the processed video signals may cause one of two-dimensional filtering and three-dimensional filtering to be superior to the other. For example, when performing three-dimensional comb filtering on a current signal, significant motion between the current video frame and the previous video frame may result in a poor frame comb. In such a situation, it may be preferable for the video processing system to utilize only two-dimensional comb filtering in processing the current signal. In other scenarios, it may be preferable for the video processing system to utilize only three-dimensional comb filtering instead of two-dimensional comb filtering. In still other scenarios, it may be beneficial to perform comb filtering utilizing a combination of three-dimensional and two-dimensional comb filtering.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and method are provided for improved processing of comb filtered signals. Various aspects of the present invention may comprise method steps and system components that generate a signal indicative of the quality of a field-combed signal. Various aspects may generate a first signal indicative of inter-field signal difference substantially outside the chroma frequency band. Various aspects may generate a second signal indicative of inter-field and inter-line signal difference substantially inside the chroma frequency band.

Various aspects of the present invention may, for example, generate the second signal based on a plurality of signals indicative of inter-field and inter-line signal difference substantially inside the chroma frequency band. Various aspects may generate the second signal based on a signal indicative of inter-field luma difference and inter-field chroma difference substantially inside the chroma frequency band. Various aspects may generate the second signal based on an inter-field chroma signal substantially inside the chroma frequency band. Various aspects may generate the second signal based on a determination of the minimum magnitude of a plurality of various signal difference indications substantially inside the chroma frequency band.

Various aspects of the present invention may determine an indication of field comb quality based at least in-part on the first signal and the second signal, and generate a corresponding signal indicative of the field comb quality. Various aspects may, for example, determine the field comb quality indication based on a weighted sum of the magnitudes of the first and second signals.

Various further aspects of the present invention may comprise method steps and system components that utilize the field comb quality indication in generating a comb-filtered signal. Various aspects may generate a field comb signal and a line comb signal. Various aspects may generate a comb filtered signal based on the field comb signal, line comb signal, and the field comb quality indication. Various aspects may also generate an indication of line comb quality and generate a comb filtered signal based on the field comb signal, field comb quality indication, line comb signal, and line comb quality indication.

Various aspects may, for example, determine weighting factors to apply to the field comb signal and the line comb signal. Such weighting factors may, for example, be based on the field comb quality indication and may also be based on the line comb quality indication. Various aspects may generate a comb filtered signal based on the field comb signal, line comb signal, and the weighting factors.

These and other advantages, aspects and novel features of the present invention, as well as details of illustrative aspects thereof, will be more fully understood from the following description and drawings.

DETAILED DESCRIPTION OF THE INVENTION

Figure 1:
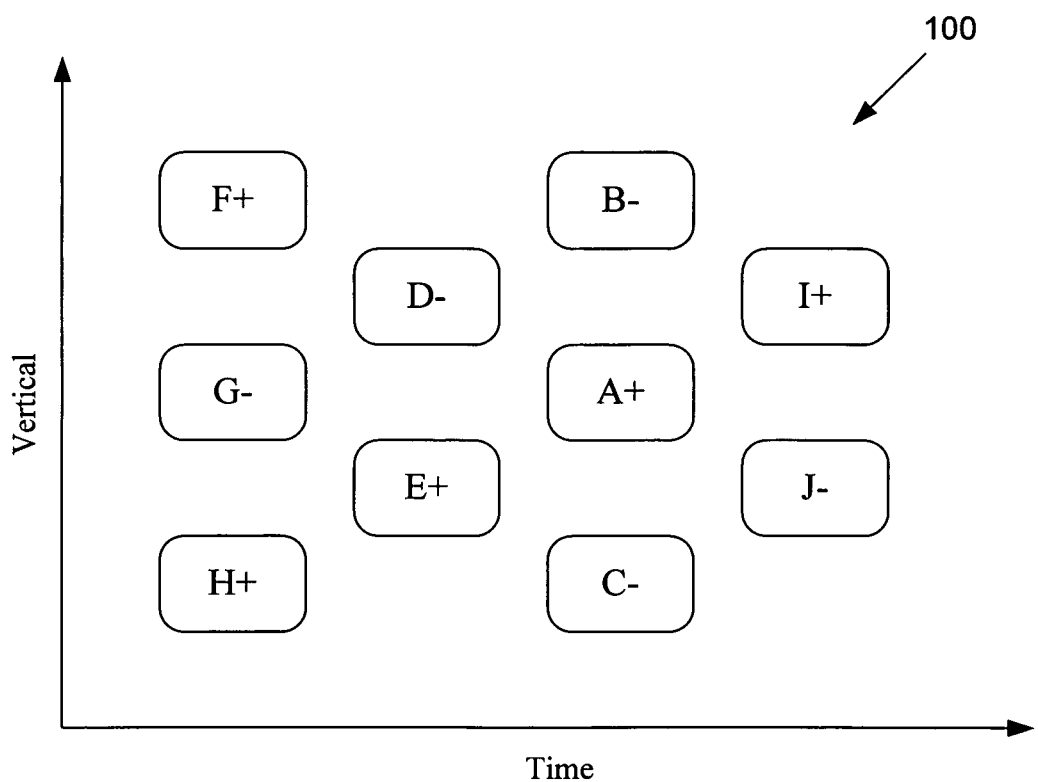
FIG. 1 is a diagram illustrating exemplary spatial and temporal alignment of video information.

FIG. 1 is a diagram 100 illustrating exemplary spatial and temporal alignment of video information. The vertical axis of the diagram 100 shows the vertical spatial relationship, or vertical displacement, between the signals (or samples), while the horizontal axis of the diagram 100 shows the temporal relationship, or time difference, between the signals. For illustrative purposes, consider all of the signals (or signal samples) illustrated in FIG. 1 to be spatially horizontally aligned (i.e., aligned in the horizontal spatial dimension, which is not represented in the diagram 100). For the following discussion, the illustrative signals, A-J, will be referred to generally as signals. A signal may, for example, represent a single digitally sampled value of video information, but may also represent an entire video line of video information or other groupings of video information where appropriate.

Consider, for example, the current signal of interest may be the signal labeled "A." Signal G may represent a signal corresponding spatially (i.e., vertically spatially by the vertical axis of the diagram, and horizontal spatially by the above assumption) to sample A, but not temporally. In other words, the diagram 100 shows signals A and G with no relative vertical displacement, but with a displacement along the horizontal axis, which represents the time domain. The diagram 100 may, for example, represent signal G as spatially corresponding to signal A, but temporally corresponding to the video frame just prior to the video frame of signal A.

For the following discussion, a set of two adjacent interlaced video fields may be referred to as a "video frame." Note that for the following discussion regarding exemplary aspects of the present invention, the terms "field" and "frame" may often be used interchangeably. For example, a comb-filtered signal formed using two fields may be referred to as a "field comb signal" or a "frame comb signal." Also for example, a difference between two signals in different fields may be referred to as a "field difference signal" or a "frame difference signal." Such designations are generally exemplary and should, by no means, limit the scope of various aspects of the present invention to either "fields" or "frames" or various characteristics thereof.

The diagram 100 also, for example, illustrates signal B, which may represent a signal that corresponds temporally to sample A (i.e., the diagram 100 shows no horizontal displacement between signals A and B). For example, signal B may be from the same video field as signal A. However, the diagram 100 also indicates a vertical displacement between signals A and B. Thus, signal B may be, for example, spatially horizontally aligned with signal A (by the above assumption), temporally aligned with signal A (as shown by the horizontal axis of the diagram 100), and spatially vertically displaced from signal A (as shown by the vertical axis of the diagram 100). For example, signal B may represent information of the video pixel directly above a pixel represented by signal A on a video screen. Similarly, signal C may represent information of the video pixel directly below the pixel represented by signal A on a video screen.

Similarly, signals D and E may represent signals in the video field temporally adjacent and prior to the video field of signals B, A and C. Likewise, signals I and J may represent signals in the video field temporally adjacent and after the video field of signals B, A and C. Lastly, signals F, G and H may represent signals corresponding spatially to signals B, A and C in the video frame just prior to the video frame of signals B, A and C. Note that the particular relationship between signals illustrated in the diagram 100 is for explanatory and illustrative purposes. Accordingly, the scope of various aspects of the present invention should, by no means, be limited to particular spatial and temporal relationships between signals.

Also shown in FIG. 1, the plus and minus signs in the diagram 100 indicate relative phase of the chroma sub-carrier in the signal. For example since signal A has a chroma sub-carrier with a relative phase of "+," signals F, H, E and I have respective chroma sub-carriers with the same phase as signal A. Conversely, since signals G, D, B, C and J each have phase indications of "-," their respective chroma sub-carriers are 180 degrees out of phase with the chroma sub-carrier of signal A.

This phase relationship, as discussed earlier, may be useful in filtering signals. For example, in video applications, the signals may contain both chroma and luma information. A method of extracting a chroma component may, for example, include subtracting two signals with opposite chroma phases to cancel out the respective luma components and leave a sum of the signal chroma components.

Figure 2:
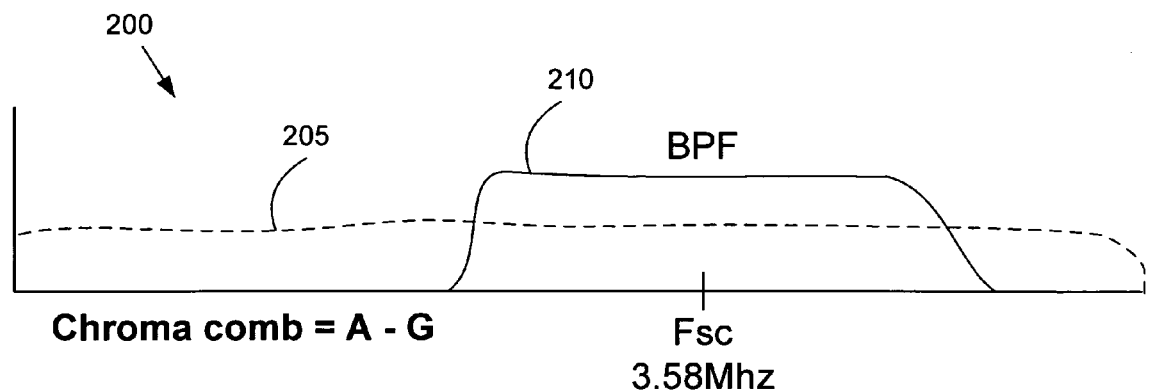
FIG. 2 is a diagram illustrating spectral content of an exemplary filtered chroma comb signal.

FIG. 2 is a diagram 200 illustrating spectral content of an exemplary chroma comb signal 210 formed by subtracting an exemplary signal G- from a corresponding signal A+ with opposite chroma phase. The dashed line 205 illustrates an exemplary signal that includes both luma and chroma components. The frequency spectrum of the resulting chroma comb signal 210 shows the spectral components associated with the remaining chroma signal component. In this example, the chroma sub-carrier is centered at a frequency of 3.58 MHz and may have a bandwidth approximately illustrated by the solid line 210. Various signal processing methods may include filtering the chroma signal using a band-pass filter (BPF) to remove signal components outside the expected frequency range of chroma signal components (i.e., the chroma frequency band). Various other signal processing methods may include, for example, band-stop filtering the chroma signal using a band-stop filter (BSF) to analyze remaining luma components that may not have cancelled during the chroma comb signal forming process (e.g., inter-field luma difference). Such a filtered signal may provide an indication of the quality or integrity of the chroma comb signal. Note that, as illustrated by the dashed line 205, luma frequency components may exist in the chroma frequency band.

Figure 3:
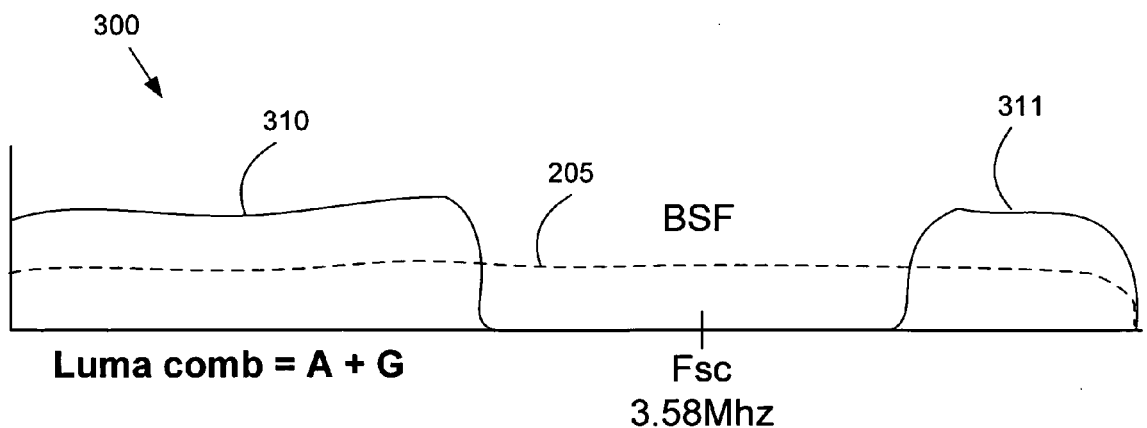
FIG. 3 is a diagram illustrating spectral content of an exemplary filtered luma comb signal.

A method of extracting luma components from an original signal may include, for example, adding the original signal and a corresponding signal with an opposite chroma phase to cancel out the chroma components and leave the luma components. FIG. 3 is a diagram 300 illustrating spectral content of an exemplary band-stop filtered luma comb signal 310-311. Such an exemplary signal may be formed, for example, by first adding exemplary signals A+ and G− to form a luma comb signal and then band-stop filtering the luma comb signal at the chroma frequency band. Alternatively, a variety of signal processing methods may be utilized to analyze the luma comb signal. Such signal processing methods may include, for example; band-pass filtering the luma comb signal at the chroma frequency band to analyze signal components remaining in this band. Such signal components may, for example, include luma components in the chroma frequency band or may, for example, include chroma components that did not properly cancel while forming the luma comb signal (e.g., inter-field chroma difference).

Figure 4:
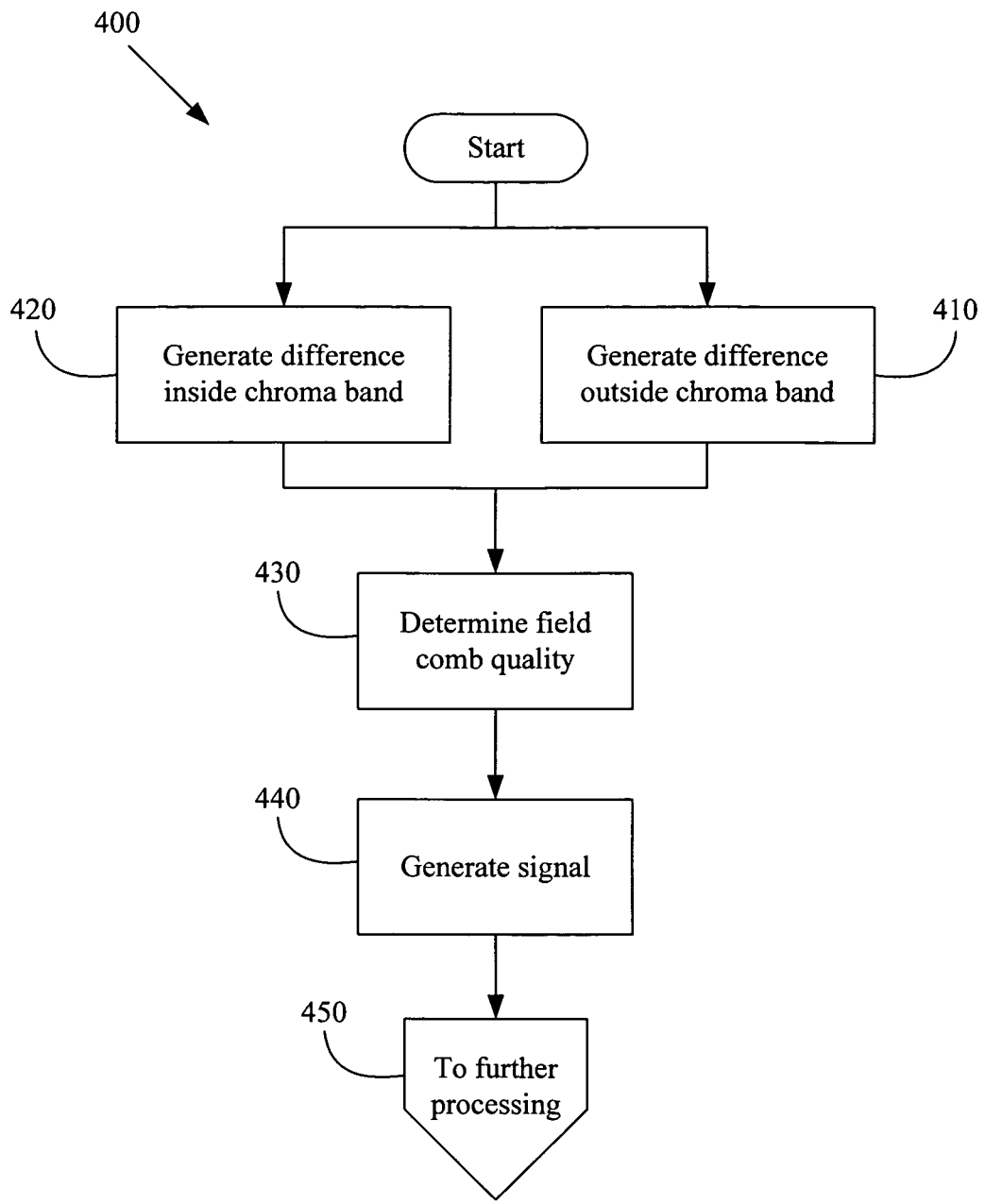
FIG. 4 is a diagram illustrating a method for generating a signal indicative of field comb quality, in accordance with various aspects of the present invention.

FIG. 4 is a diagram illustrating a method 400 for generating a signal indicative of field comb quality, in accordance with various aspects of the present invention. The method 400 includes, at step 410, generating a first signal indicative of inter-field signal difference substantially outside the chroma frequency band. Note that the scope of various aspects of the present invention is by no means to be limited to characteristics of step 410.

Step 410 may first, for example, include generating a signal indicative of inter-field (or inter-frame) signal difference. Step 410 may include generating such a signal by determining a difference between a first signal in a first video field and a second signal in a second video field. The first video field and second video field may, for example, be temporally displaced by one frame interval, and may further be temporally adjacent. For example and without limitation, referring back to FIG. 1, step 410 may generate a signal indicative of inter-field (or inter-frame) signal difference by adding or subtracting signals (or samples) A and G. As an exemplary illustration, step 410 may subtract one of signals A and G from the other to generate an inter-field difference signal where the respective luma signals generally cancel, leaving a signal with chroma content and inter-field luma difference. Such a signal is an example of an inter-field chroma signal. Such an inter-field chroma signal may, for example, be formed using signals from a wide array of different fields and frames.

The signal indicative of inter-field (or inter-frame) signal difference should not be limited to exclusively inter-field information. For example and without limitation, the signal indicative of inter-field difference may also comprise indications of inter-line signal difference.

Step 410 may also include removing frequency components generally corresponding to the chroma frequency band. Step 410 may, for example, utilize a band-stop filter to accomplish such removal. Step 410 may include performing such filtering on original signals prior to generating the inter-field difference signal, or may alternatively perform such filtering on the generated inter-field difference signal. Continuing the exemplary illustration discussed previously, step 410 may include filtering the inter-field difference signal formed by subtracting signals A and G to remove frequency components generally corresponding to the chroma frequency band. Such a filtered signal may then primarily include a signal including inter-field luma difference frequency components substantially outside the chroma frequency band. Exact boundaries of any such filtering, if performed, may stray from the chroma frequency band boundaries without departing from the spirit and scope of various aspects of the present invention.

The method 400 includes, at step 420, generating a signal indicative of signal difference substantially inside the chroma frequency band. Step 420 may first include, for example, generating a signal indicative of inter-field and/or inter-line signal difference. Step 420 may include generating such a signal by determining a difference between a first signal in a first video field and a second signal in a second video field. The first video field and second video field may, for example, be temporally displaced by one frame interval and may further be temporally adjacent. The first signal and second signal may also, for example, be from video lines that are vertically displaced from each other and which may also be vertically adjacent.

For example and without limitation, referring back to FIG. 1, step 420 may include generating a signal indicative of inter-field (or inter-frame) and inter-line signal difference by adding or subtracting signals (or samples) G and B, which correspond to different video fields and different video lines within their respective video fields. As an exemplary illustration, step 420 may include subtracting one of signals G and B from the other to generate an inter-field and inter-line difference signal where the respective chroma signals and respective luma signals generally cancel, leaving a signal with components of inter-field chroma and luma difference and inter-line chroma and luma difference.

Step 420 may also include removing frequency components generally outside of the chroma frequency band. Step 420 may, for example, utilize a band-pass filter to accomplish such frequency component removal. Step 420 may include performing such filtering on original signals prior to generating the inter-field and/or inter-line difference signal, or may alternatively perform such filtering on the generated inter-field and/or inter-line difference signal. Continuing the exemplary illustration discussed previously, step 420 may band-pass filter the inter-field and inter-line difference signal formed by subtracting signals G and B to remove frequency components generally outside of the chroma frequency band. Such a filtered signal may then primarily include a signal including inter-field luma and chroma difference and inter-line luma and chroma difference with frequency components substantially inside the chroma frequency band. As explained with step 410, exact boundaries of any such filtering, if performed, may stray from the chroma frequency band boundaries without departing from the spirit and scope of various aspects of the present invention.

Note that the exemplary illustration utilizing signals G and B is merely an example to illustrate a difference signal having inter-field (or inter-frame) and inter-line difference components and should, by no means, limit the scope of various aspects of the present invention to processing particular signals or signal pairs. For example, the method 400 may utilize a variety of signal pairs or higher order combinations to generate a difference signal having inter-field and/or inter-line difference components (e.g., referring to FIG. 1, signal pairs FA, HA, GB, GC, DJ, EI, and various other combinations of signals from different fields/frames and different lines, including signals to the right, left, above and/or below those illustrated in FIG. 1, as well as signals that may be horizontally offset from each other).

Step 420 may, for example, include analyzing multiple signals and signal combinations to determine and generate the signal indicative of inter-field and/or inter-line signal difference. For example, step 420 may include generating and utilizing multiple inter-field and inter-line difference signals. Step 420 may, for example, include generating and utilizing signals indicative of inter-field chroma and luma difference that do not include indications of inter-line chroma and luma difference. Step 420 may, for example, generate and utilize an inter-field chroma signal such as that discussed above with respect to step 410. Accordingly, the scope of various aspects of the present invention should, by no means be limited to processing specific signals and combinations of signals.

The method 400 includes, at step 430, determining field comb quality based at least in-part on the signal indicative of inter-field signal difference substantially outside the chroma frequency band, generated at method step 410, and the signal indicative of inter-field and/or inter-line signal difference substantially inside the chroma frequency band, generated at method step 420. Alternatively, step 430 may include determining field comb quality based solely on the results of step 420 (i.e., not based on the signal indicative of inter-field signal difference substantially outside the chroma band generated at step 410). For example and without limitation, step 430 may include determining field comb quality based on magnitudes of the signals generated in step 410 and step 420.

Step 430 may include analyzing a plurality of magnitudes corresponding to a plurality of signals generated at step 420. For example, step 430 may include determining a minimum magnitude of such a plurality of magnitudes and utilizing the minimum magnitude as an indicator of field comb quality. Step 430 may, for example, include determining an indicator of field comb quality based on a weighted average of at least a portion of signals generated at step 410 and step 420. For example, step 430 may include determining an indicator of field comb quality based on a weighted sum of a signal generated at step 410 multiplied by a first weighting factor and a minimum magnitude of a plurality of signals generated at step 420 multiplied by a second weighting factor.

The method 400 includes, at step 440, generating a signal indicative of the field comb quality determined at step 430. Such a signal may include, for example, a signal indicative of the field comb quality, such as a digital or analog data signal. The method 400 then proceeds to further processing at step 450, which may include, for example, utilizing the signal indicative of field comb quality to make decisions regarding comb filtering. For example, and without limitation, such decisions may include decisions regarding when and how to perform comb filtering.

Figure 5:
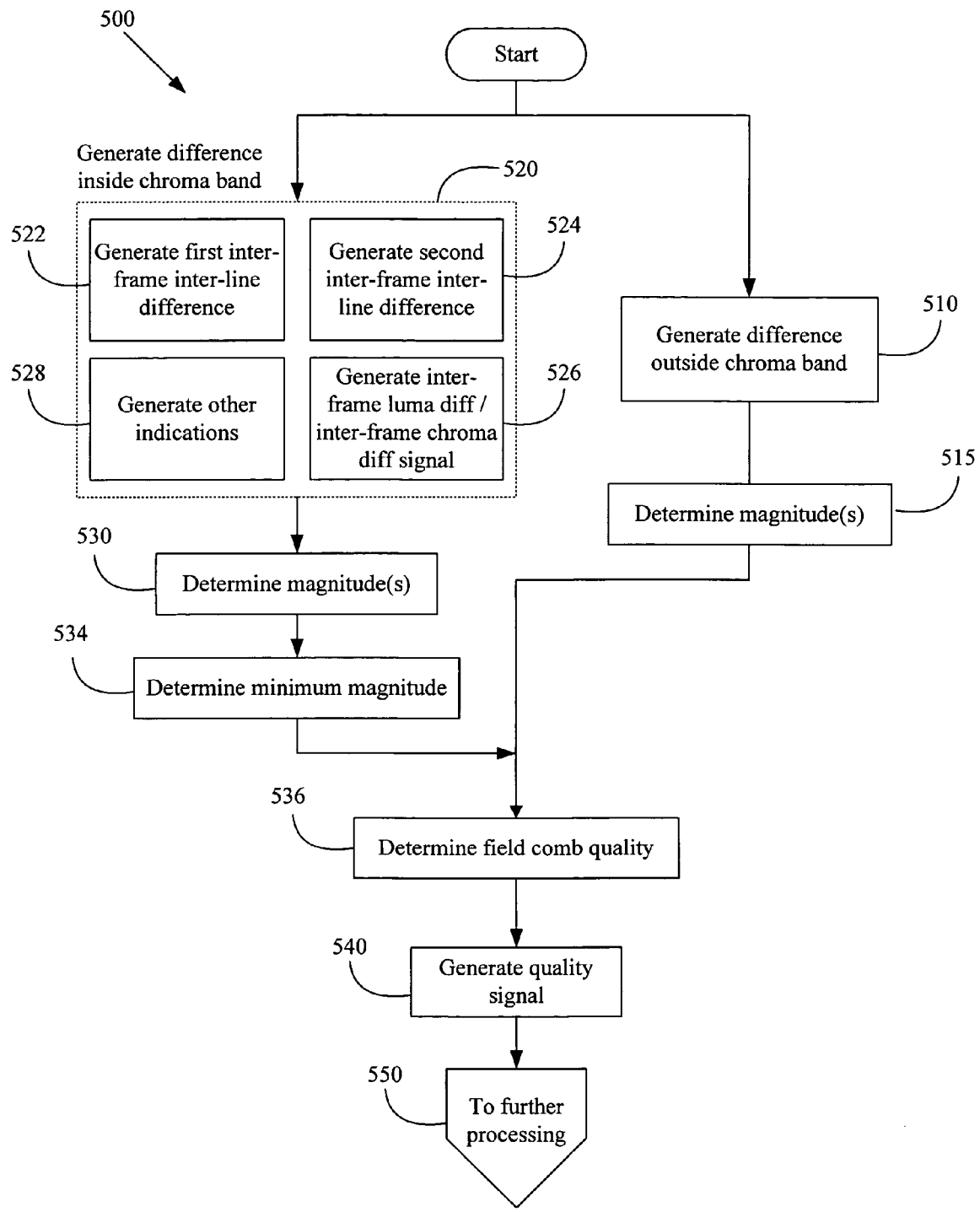
FIG. 5 is a diagram illustrating a method for generating a signal indicative of field comb quality, in accordance with various aspects of the present invention.

FIG. 5 is a diagram illustrating a method 500 for generating a signal indicative of field comb quality in accordance with various aspects of the present invention. The exemplary method 500 illustrates a portion of the various aspects of the method 400 shown in FIG. 4 and also exemplifies various additional aspects of the present invention. The method 500 includes, at step 510, generating a signal indicative of inter-field signal difference substantially outside the chroma frequency band. Step 510 may share various aspects with step 410 discussed previously in the FIG. 4 discussion. Note that various aspects of the present invention by no means require utilizing step 510 or utilization of the signal generated in step 510. The method 500 may follow step 510 with a magnitude determining step 515, which determines the magnitude of the signal output from step 510.

As explained earlier with regard to the method 400 illustrated in FIG. 4, the signal indicative of inter-field (or inter-frame) signal difference should not be limited to exclusively inter-field information. For example and without limitation, the signal indicative of inter-field difference may also comprise indications of inter-line signal difference.

The method 500 includes, at step 520, generating a signal indicative of signal difference substantially inside the chroma frequency band. Step 520 may include, for example, at step 522, generating a signal indicative of inter-field (or inter-frame) and inter-line signal difference. Step 522 may include, for example, generating such a signal by determining a difference between a first signal in a first video field and a second signal in a second video field. The first video field and second video field may, for example, be temporally displaced by a field or frame interval or multiples thereof. The first signal and second signal may also, for example, be from video lines that are vertically displaced from each other and which may also, for example, be vertically adjacent.

For example and without limitation, referring back to FIG. 1, step 522 may include generating a signal indicative of inter-field and inter-line signal difference by adding or subtracting signals (or samples) G and B, which correspond to different video fields and different video lines within their respective video fields. As an exemplary illustration, step 522 may include subtracting one of signals G and B from the other to generate an inter-field and inter-line difference signal where the respective chroma signals and respective luma signals generally cancel, leaving a signal with components of inter-field chroma and luma difference and inter-line chroma and luma difference.

As further exemplary illustrations, step 522 may include determining differences between various other signal pairs or higher order combinations by adding or subtracting such signals (e.g., referring to FIG. 1, signal pairs FA, FC, GB, GC, HB, HA, DJ, EI, FD, FE, GD, GE, HE, HD, and other pairs or higher order combinations of signals corresponding to different fields and lines). Accordingly, the scope of various aspects of the present invention should, by no means, be limited to processing particular signals or signal combinations.

Step 520 may, for example, include analyzing multiple signals and signal combinations to determine and generate the signal indicative of inter-field and/or inter-line signal difference. Such signals may, for example, have similarly or oppositely polarized chroma sub-carriers. For example and without limitation, step 520 may generate and utilize multiple inter-field and inter-line difference signals. One such example is illustrated by exemplary method step 524, which may include generating a second signal indicative of inter-field and inter-line signal difference. Step 524 may generally generate such a signal in a manner similar to method step 522. Step 520 may include further steps to generate additional signals like that of steps 522 and 524.

As an additional example, step 520 may generate and utilize signals indicative of inter-field chroma and luma difference that do not include indications of inter-line chroma and luma difference. The method 500 includes, at step 526, generating such a signal. Step 526 may include, for example, generating a signal A' that generally corresponds to an estimate of various aspects of signal A. The signal A' may, for example, include a chroma component that corresponds to an estimated chroma component for signal A, but with the modulation polarity reversed. That is, step 526 may include generating a signal A' with a chroma component magnitude indicative of signal A's chroma component magnitude, but with the same sub-carrier phase as the chroma component of signal G. The signal A' may also include a luma component that corresponds to an estimated luma component for signal A. Step 526 may then include determining a difference between signals A' and G, with such a difference representing both inter-field chroma difference and inter-field luma difference.

Step 526 may utilize various methods to determine such a signal A'. For example, step 526 may include utilizing signals horizontally left or right of signal (or sample) A to a point where the chroma sub-carrier is 180 degrees out of phase with the chroma sub-carrier at signal A. By way of example, with a chroma sub-carrier center frequency of approximately 3.58 MHz and a sampling rate of 27 MHz, moving right or left approximately 3.771 samples yields a 180 degree phase shift in the chroma sub-carrier. Step 526 may include interpolating between samples to obtain an estimate of the desired signal at a non-integer number of samples. Step 526 may additionally include utilizing a plurality of samples to arrive at a desired estimate for the signal A chroma. For example, step 526 may include averaging signal values obtained utilizing signals on both sides of signal A (e.g., average the values at sample A−3.771 samples and sample A+3.771 samples).

Step 520 may further include, at step 528, utilizing various other signal pairs and combinations (e.g., comparing such signal pairs to arrive at difference indications) to arrive indications of expected comb filter quality substantially within the chroma frequency band. For example, Step 528 may include determining a difference between signals A and G, with such a difference representing both inter-field chroma difference and inter-field luma difference.

Step 520 may also include removing frequency components generally outside of the chroma frequency band from the signals generated in the various exemplary difference generating steps 522-528. Step 520 may, for example, include utilizing a band-pass filter to accomplish such removal. Step 520 may include performing such filtering on original signals prior to generating an inter-field and/or inter-line difference signal, or may alternatively include performing such filtering on the generated inter-field and/or inter-line difference signal (s).

The method 500 may include, at step 530, determining magnitudes of various signals generated in step 520. For example, step 530 may include determining a magnitude of one or more signals indicative of inter-field and inter-line chroma difference substantially inside the chroma frequency band, such as may be generated at steps 522 and 524. Also for example, step 530 may include determining a magnitude of one or more signals indicative of inter-field luma and chroma difference substantially inside the chroma frequency band, such as may be generated at step 528. Further, for example, step 530 may include determining a magnitude of alternative signal indications substantially inside the chroma frequency band, such as may be generated at step 526. The examples presented above are by no means exclusive.

The method 500 may include, at step 534, determining a minimum magnitude of various magnitudes generated at step 530. For example, step 534 may include determining a minimum magnitude of various magnitudes corresponding to signal differences substantially inside the chroma frequency band. As an exemplary illustration, step 534 may include determining a minimum magnitude from a group of magnitudes including: a magnitude of a first inter-field and inter-line difference signal substantially inside the chroma frequency band, a magnitude of a second inter-field and inter-line difference signal substantially inside the chroma frequency band, a magnitude of an inter-field luma and chroma difference signal substantially inside the chroma frequency band, and a magnitude of an inter-field chroma signal substantially inside the chroma frequency band. Such signals may, for example, be generated by method steps 520-528.

The method 500 may include, at step 536, determining a field comb quality indication. Step 536 may include analyzing a plurality of magnitudes, such as those generated at step 534. Step 536 may include basing the field comb quality indication on, for example, a minimum magnitude of inter-field signal difference substantially inside the chroma frequency band. Step 536 may include basing the field comb quality indication on, for example, a minimum of various magnitudes determined at step 534. Step 536 may include basing the field comb quality indication on a combination of the inter-field signal difference substantially outside the chroma frequency band, and a minimum of various magnitudes of signal difference substantially inside the chroma frequency band.

As an illustrative example, step 536 may include determining the field comb quality indication based at least in-part on a weighted average of the magnitude of inter-field signal difference substantially outside the chroma frequency band, and a minimum magnitude of various signals corresponding to signal difference substantially inside the chroma frequency band.

By way of example, step 536 may include generating a first value by multiplying the magnitude of inter-field signal difference substantially outside the chroma frequency band by a weighting factor, $P_f$. Step 536 may then include generating a second value by multiplying the minimum magnitude of various signal difference indications substantially inside the chroma frequency band by a weighting factor, $(1-P_f)$. Step 536 may then include adding the first value to the second value to obtain a raw quality indication. Step 536 may further include processing to tailor such a raw quality indication to a particular signal processing situation.

For example, step 536 may include performing a coring operation on the raw quality indication to eliminate relatively small values. Step 536 may include, for example, clipping the raw quality indication to set a maximum value. Step 536 may include multiplying the raw quality indication by a scaling factor to establish a general range of values. Step 536 may also, for example, include low-pass filtering the raw quality indication to smooth erratic shifts, which may for example result from signal noise. Step 536 may also, for example, include performing a non-linear mathematical operation on the raw quality indication to adjust the effect of the indication on subsequent steps. In general, step 536 may include performing a large variety of various numerical manipulation techniques to tailor the quality indication to a particular signal processing situation.

The method 500 lastly includes, at step 540, generating a signal indicative of the field comb quality determined at step 536. Such a signal may include, for example, a signal indicative of the field comb quality, such as a digital or analog data signal. The method 500 may then proceed to further processing at step 550, which may include utilizing the signal indicative of field comb quality to make decisions regarding comb filtering. For example, and without limitation, such decisions may include decisions regarding when and how to perform comb filtering. One such example of subsequent signal processing is illustrated in FIG. 6.

Figure 6:
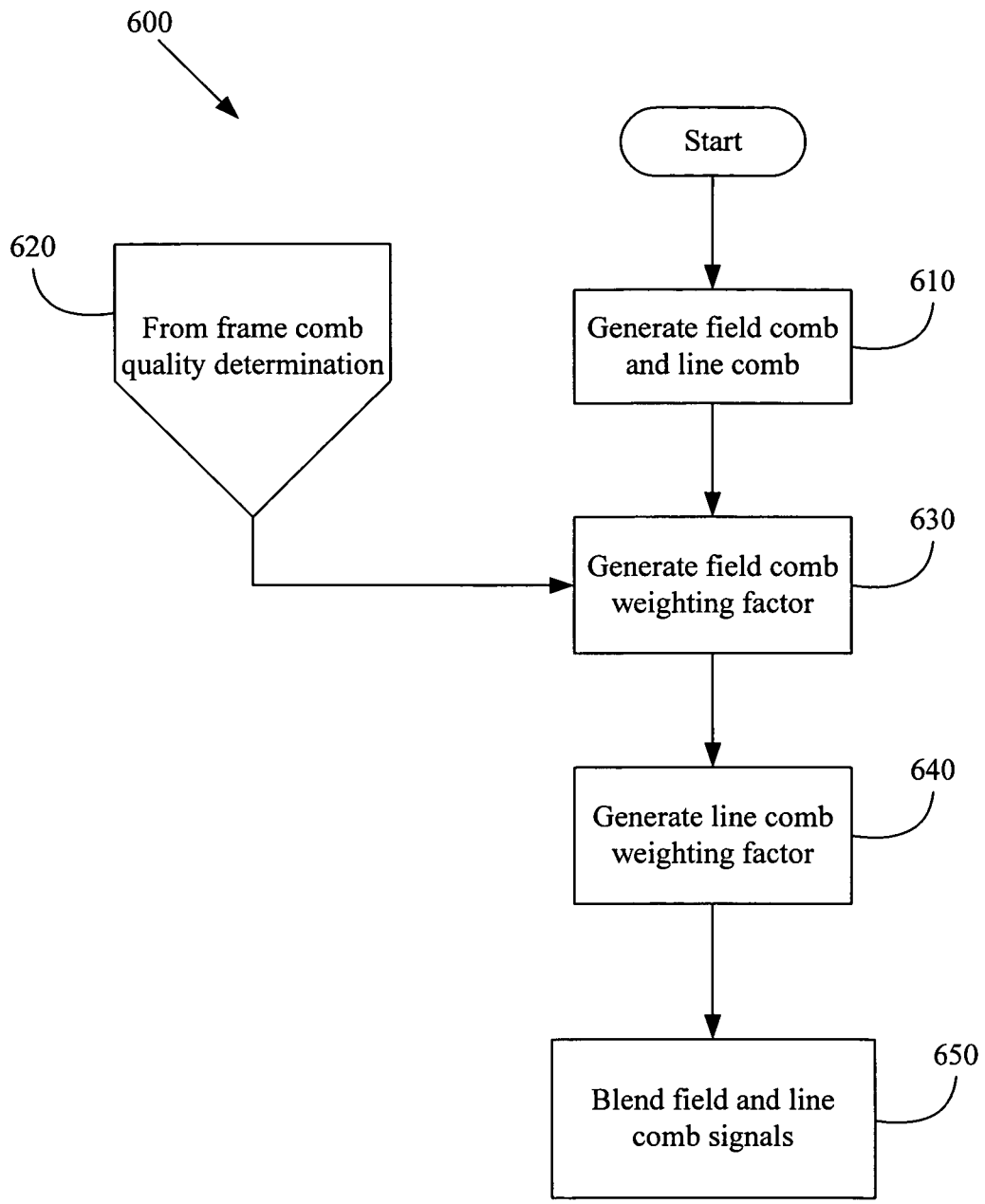
FIG. 6 is a diagram illustrating a method for generating a comb filtered signal, in accordance with various aspects of the present invention.

FIG. 6 is a diagram illustrating a method 600 for generating a comb-filtered signal, in accordance with various aspects of the present invention. The method 600, at step 610, includes generating a field comb signal and a line comb signal. Step 610 may employ a variety of methods to generate such signals.

The method 600, at step 630, includes generating a field comb weighting factor. Step 630 may, for example at step 620, include receiving the field comb quality signal generated at steps 440 and 540 of the methods 400 and 500 illustrated in FIGS. 4 and 5, respectively. Alternatively, step 620 may include receiving such a field comb quality indication from another source. Step 630 may include further processing a received field comb quality indication to generate a weighting factor with desired minimum, maximum and range characteristics. For example step 630 may include generating a normalized field comb weighting factor.

The method 600, at step 640, includes generating a line comb weighting factor. Such a line comb weighting factor may be based on various criteria utilized to determine the quality of a line comb. Step 640 may include processing the range and other characteristics of the line comb weighting factor to match the range and other characteristics of the field comb weighting factor. For example, step 640 may include generating a normalized line comb weighting factor.

The method 600, at step 650, includes generating a blended comb signal based at least in-part on the field and line comb signals generated at step 610. Step 650 may, for example, calculate a weighted sum of the field and line comb signals using the field comb weighting factor generated at step 630 and the line comb weighting factor generated at step 640. Step 650 may include scaling the weighted sum to an appropriate range for subsequent use.

Figure 7:
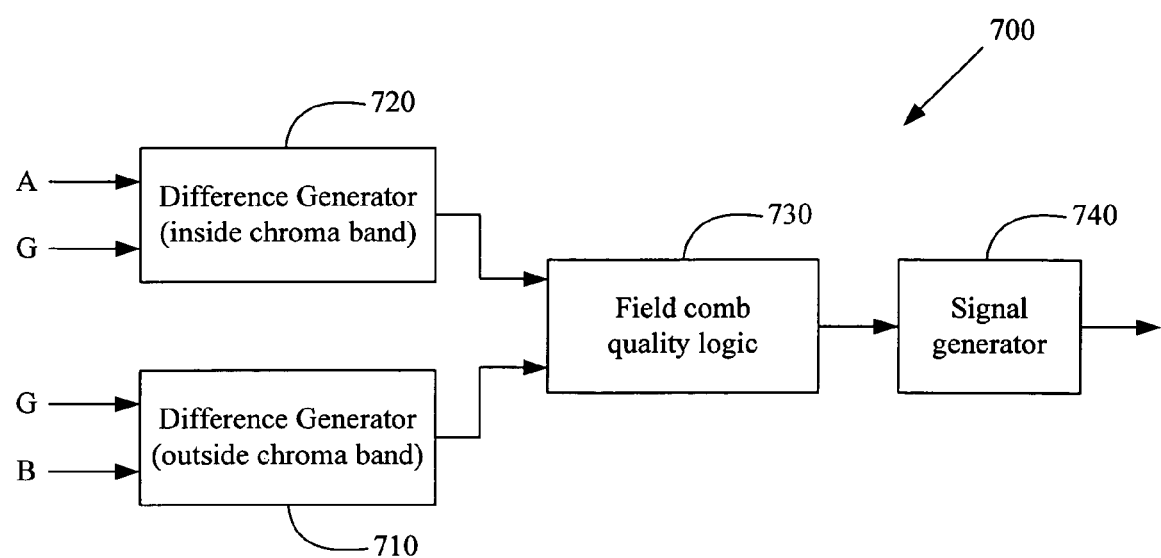
FIG. 7 is a diagram showing a system for generating a signal indicative of field comb quality, in accordance with various aspects of the present invention.

FIG. 7 is a diagram showing a system 700 for generating a signal indicative of field comb quality, in accordance with various aspects of the present invention. The system 700 includes a first difference generating module 710 and a second difference generating module 720. The system 700 also includes logic circuitry 730 that determines field comb quality and a signal generator 740.

The first difference generating module 710 may generate a signal indicative of inter-field signal difference substantially outside the chroma frequency band. The first difference generating module 710 may first, for example, generate a signal indicative of inter-field signal difference. The first difference generating module 710 may, for example, generate such a signal by determining a difference between a first signal in a first video field and a second signal in a second video field. The first video field and second video field may, for example, be temporally displaced by one field interval and may also be temporally adjacent. For example and without limitation, referring back to FIG. 1, the first difference generating module 710 may generate a signal indicative of inter-field signal difference by adding or subtracting signals (or samples) A and G. As an exemplary illustration, the first difference generating module 710 may subtract one of signals A and G from the other to generate an inter-field difference signal where the respective luma signals generally cancel, leaving a signal with primarily chroma content and inter-field luma difference.

Note that the signal indicative of inter-field (or inter-frame) signal difference should not be limited to exclusively inter-field information. For example and without limitation, the signal indicative of inter-field difference may also comprise indications of inter-line signal difference.

The first difference generating module 710 may also remove frequency components from the inter-field difference signal that generally correspond to the chroma frequency band. The first difference generating module 710 may, for example, utilize a band-stop filter to accomplish such removal. The module 710 may perform such filtering on original signals prior to generating the inter-field difference signal, or may alternatively perform such filtering on the generated inter-field difference signal. Continuing the exemplary illustration discussed previously, the module 710 may filter the inter-field difference signal formed by subtracting signals A and G to remove frequency components generally corresponding to the chroma frequency band. Such a filtered signal may then primarily include a signal including inter-field luma difference frequency components substantially outside the chroma frequency band. The first difference generating module 710 may then communicate the filtered signal to subsequent signal processing modules.

The second difference generating module 720 generates a signal indicative of signal difference substantially inside the chroma frequency band. The second difference generating module 720 may first, for example, generate a signal indicative of inter-field and/or inter-line signal difference. The module 720 may generate such a signal by determining a difference between a first signal in a first video field and a second signal in a second video field. The first video field and second video field may, for example, be temporally displaced by one frame interval and may also be temporally adjacent. The first signal and second signal may also, for example, be from video lines that are vertically displaced and vertically adjacent.

For example and without limitation, referring back to FIG. 1, the second difference generating module 720 may generate a signal indicative of inter-field and inter-line signal difference by adding or subtracting signals (or samples) G and B, which correspond to different video fields and different video lines within their respective video fields. As an exemplary illustration the module 720 may subtract one of signals G and B from the other to generate an inter-field and inter-line difference signal where the respective chroma signals and respective luma signals generally cancel, leaving a signal with components of inter-field chroma and luma difference and inter-line chroma and luma difference.

The second difference generating module 720 may also remove frequency components generally outside of the chroma frequency band. The module 720 may, for example, include and utilize a band-pass filter to effect such removal. The module 720 may perform such filtering on original signals prior to generating the inter-field and/or inter-line difference signal, or may alternatively perform such filtering on the generated inter-field and/or inter-line difference signal. Continuing the exemplary illustration discussed previously, the module 720 may filter the inter-field and inter-line difference signal formed by subtracting signals G and B to remove frequency components generally outside of the chroma frequency band. Such a filtered signal may then primarily include a signal including inter-field luma and chroma difference and inter-line luma and chroma difference with frequency components substantially inside the chroma frequency band.

Note that the exemplary illustration utilizing signals G and B is merely an example to illustrate a difference signal having inter-field and inter-line difference components and should, by no means, limit the scope of various aspects of the present invention to particular signals or signal pairs. For example, the system 700 may utilize a variety of signal pairs or higher order combinations to generate a difference signal having inter-field and inter-line difference components (e.g., referring to FIG. 1, signal pairs FA, FC, GB, GC, HB, HA, DJ, EI, FD, FE, GD, GE, HE, HD, and other pairs or higher order combinations of signals corresponding to different fields and lines). Accordingly, the scope of various aspects of the present invention should, by no means, be limited to processing particular signals or signal combinations.

The second difference generating module 720 may, for example, analyze multiple signals and signal combinations to determine and generate the signal indicative of inter-field and/or inter-line signal difference. For example, the module 720 may generate and utilize multiple inter-field and inter-line difference signals. The module 720 may generate and utilize signals indicative of inter-field chroma and luma difference that do not include indications of inter-line chroma and luma difference. The module 720 may, for example, generate and utilize an inter-field chroma signal such as that discussed above with respect to the first difference generating module 710. Accordingly, the scope of various aspects of the present invention should, by no means be limited to specific signals and combinations of signals.

The field comb quality module 730 is communicatively coupled to the first difference generator module 710 and the second difference generator module 720. The field comb quality module 730 may, for example, receive a signal indicative of signal difference substantially outside the chroma frequency band from the first difference generating module 710 and a signal indicative of signal difference substantially inside the chroma frequency band from the second difference generating module 720.

The field comb quality module 730 may determine an estimate of field comb quality based at least in-part on the signal indicative of signal difference substantially outside the chroma frequency band generated by the first difference generating module 710 and the signal indicative of signal difference substantially inside the chroma frequency band generated by the second difference generating module 720. For example and without limitation, the quality module 730 may determine field comb quality based on magnitudes of the signals generated by the difference generating modules 710, 720. The quality module 730 may analyze a plurality of magnitudes corresponding to a plurality of signals generated by the difference generating modules 710, 720. For example, the quality module 730 may determine a minimum magnitude of such a plurality of magnitudes and utilize the minimum magnitude as an indicator of field comb quality. The quality module 730 may, for example, generate an indicator of field comb quality based on a weighted average of at least a portion of signals generated by the first and second difference generating modules 710, 720.

The signal generator 740 is communicatively coupled to the field comb quality module 730. The signal generator 740 may receive an indication of field comb quality from the field comb quality module 730 and generate an output signal corresponding to the received indication. The output signal may include, for example, a signal indicative of the field comb quality, such as a digital or analog data signal. The signal generator 740 may be communicatively coupled to various downstream apparatus or systems that may utilize the generated field comb quality signal in various signal processing activities. For example, such downstream apparatus or systems may include comb filter blending circuitry or circuitry that decides whether to process a signal utilizing field combing or line combing.

Figure 8:
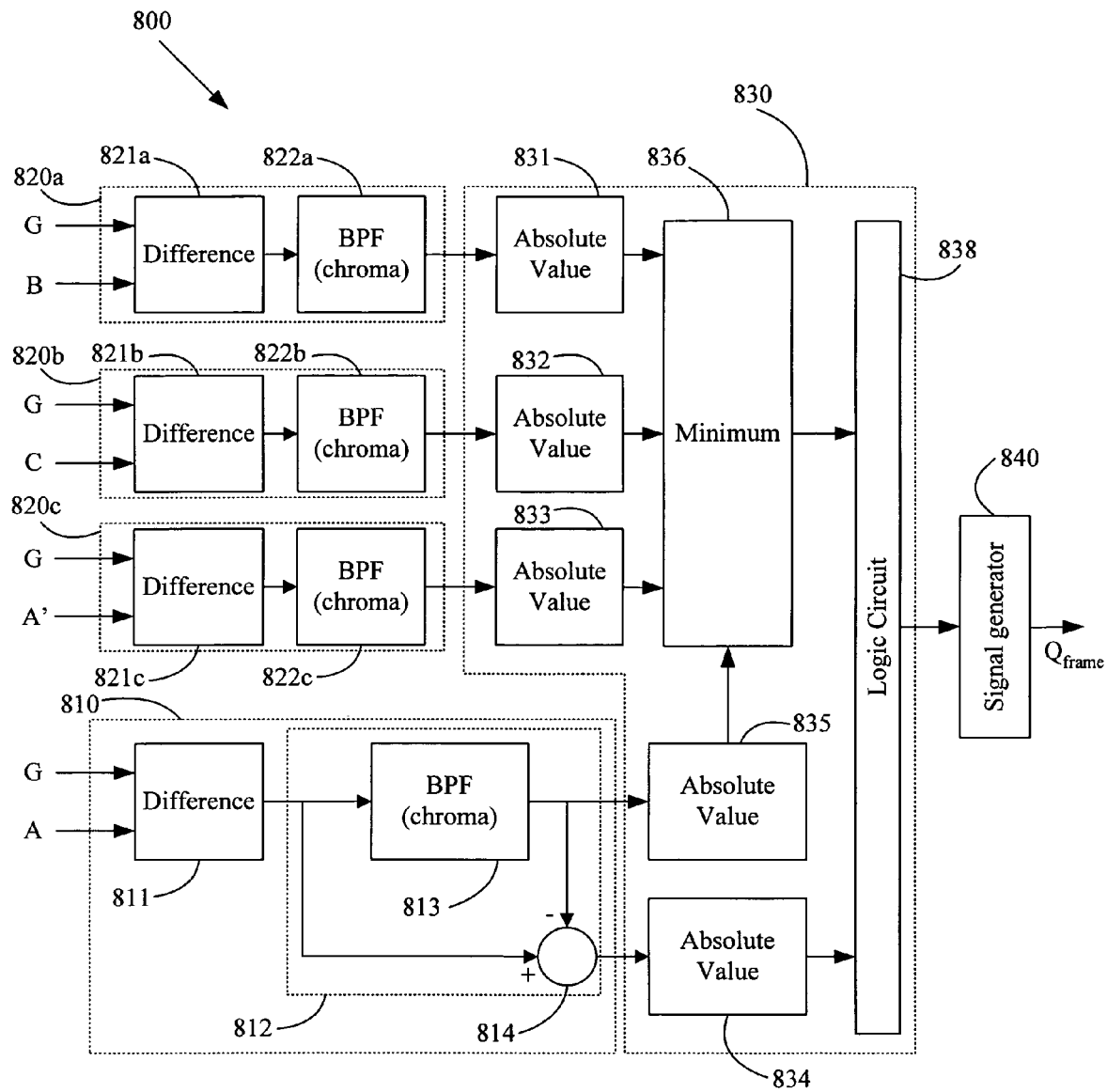
FIG. 8 is a diagram showing a system for generating a signal indicative of field comb quality, in accordance with various aspects of the present invention.

FIG. 8 is a diagram showing a system 800 for generating a signal indicative of field comb quality, in accordance with various aspects of the present invention. The exemplary system 800 illustrates a portion of the various aspects of the system 700 shown in FIG. 7 and exemplifies various additional aspects of the present invention. The system 800 includes a first difference generating module 810 that generates a first signal indicative of inter-field signal difference substantially outside the chroma frequency band. The difference generating module 810 may share various aspects with the difference generator 710 illustrated in FIG. 7 and discussed previously.

The first difference generating module 810 may include a first difference circuit 811. The first difference circuit 811 may generate a signal indicative of inter-field signal difference. The first difference circuit 811 may generate such a signal by determining a difference between a first signal in a first video field and a second signal in a second video field. The first video field and second video field may, for example, be temporally displaced by one frame interval and may also be temporally adjacent. For example and without limitation, referring back to FIG. 1, the first difference circuit 811 may generate a signal indicative of inter-field signal difference by adding or subtracting signals (or samples) A and G. As an exemplary illustration, the first difference circuit 811 may subtract one of signals A and G from the other to generate an inter-field difference signal where the respective luma signals generally cancel, leaving a signal primarily with chroma content and inter-field luma difference content.

The signal indicative of inter-field (or inter-frame) signal difference should not be limited to exclusively inter-field information. For example and without limitation, the signal indicative of inter-field difference may also comprise indications of inter-line signal difference.

The first difference generating module 810 may also utilize a band-stop filter (BSF) circuit 812 to remove frequency components from the inter-field difference signal that generally corresponding to the chroma frequency band. The BSF circuit 812 may, for example, be implemented using a first band-pass filter (BPF) circuit 813 coupled to a subtracting circuit 814. The first difference generating module 810 may perform such filtering on original signals prior to generating the inter-field difference signal, or may alternatively, as shown in FIG. 8, perform such filtering on the generated inter-field difference signal. Continuing the exemplary illustration discussed previously, the module 810 may filter the inter-field difference signal formed by subtracting signals A and G to remove frequency components generally corresponding to the chroma frequency band. Such a filtered signal may then primarily include a signal including inter-field luma difference frequency components substantially outside the chroma frequency band.

The system 800 includes a second difference generating module 820a, third difference generating module 820b, and fourth difference generating module 820c. The exemplary difference generating modules 820a-820c may share various aspects with the second difference generating module 720 shown in FIG. 7 and discussed previously. For example, the difference generating module 720 may include various difference generating sub-modules that correspond generally to one or more of the difference generating modules 820a-820c.

The second difference generating module 820a generates a signal indicative of signal difference substantially inside the chroma frequency band. The second difference generating module 820a may include a second difference circuit 821a that generates a signal indicative of inter-field and inter-line signal difference. The second difference circuit 821a may generate such a signal by determining a difference between a first signal in a first video field and a second signal in a second video field. The first video field and second video field may, for example, be temporally displaced by one frame interval and may also be temporally adjacent. The first signal and second signal may also, for example, be from video lines that are vertically displaced from each other and which may also be vertically adjacent.

For example and without limitation, referring back to FIG. 1, the second difference circuit 821a may generate a signal indicative of inter-field and inter-line signal difference by adding or subtracting signals (or samples) G and B, which correspond to different video fields and different video lines within their respective video fields. As an exemplary illustration, the second difference circuit 821a may subtract one of signals G and B from the other to generate an inter-field and inter-line difference signal where the respective chroma signals and respective luma signals generally cancel, leaving a signal with components of inter-field chroma and luma difference and inter-line chroma and luma difference.

As further exemplary illustrations, the second difference circuit 821*a* may determine differences between various other signal pairs or higher order signal combinations by adding or subtracting such signal pairs or combinations (e.g., referring to FIG. 1, signal pairs FA, FC, GB, GC, HB, HA, DJ, EI, FD, FE, GD, GE, HE, HD, and other pairs or larger groups of signals corresponding to different fields and lines). Accordingly, the scope of various aspects of the present invention should, by no means, be construed as limited to particular signals or signal combinations.

The second difference generating module 820*a* may further include a second BPF circuit 822*a* that removes frequency components generally outside of the chroma frequency band from the difference signal generated by the second difference circuit 821*a*. The module 820*a* may perform such filtering on original signals prior to generating an inter-field and/or inter-line difference signal, or may alternatively, as shown in FIG. 8, perform such filtering on the generated inter-field and/or inter-line difference signal.

The third difference generating module 820*b* generates a signal indicative of signal difference substantially inside the chroma frequency band. The exemplary third difference generating module 820*b* includes a third difference circuit 821*b* and a third BPF circuit 822*b*. The exemplary third difference generating module 820*b* may generally share characteristics with the second difference generating module 820*a*. The exemplary third difference generating module 820*b* is shown processing signals G and C, in a manner similar to the second difference generating module 820*a* processing signals G and B, to generate a signal indicative of inter-field and inter-line difference substantially inside the chroma frequency band.

The fourth difference generating module 820*c* also generates a signal indicative of signal difference substantially inside the chroma frequency band. The exemplary fourth difference generating module 820*c* includes a fourth difference circuit 821*c* and a fourth BPF circuit 822*c*. The exemplary fourth difference generating module 820*c* may generally share characteristics with the second and third difference generating modules 820*a*, 820*b*.

The exemplary fourth difference generating module 820*c* is shown processing signals with a different relationship than the signals processed by the second and third difference generating modules 820*a*, 820*b*. The exemplary fourth difference generating module 820*c* is shown processing signals A' and G to generate a signal indicative of inter-field chroma and luma difference that does not include an indication of inter-line chroma and luma difference. The formation of signal A' and the processing thereof was described previously in the discussion regarding method step 520. The system 800 may form signal A' using, for example, hardwired logic circuitry or may utilize a processor executing instructions to generate the signal A'.

Various components of the system 800 also generate an inter-field difference signal substantially inside the chroma frequency band. In the exemplary system 800, such a signal is output from the first BPF circuit 813 discussed previously. Recall the first BPF circuit 813 is a component of the illustrative BSF circuit 812. Such an inter-field difference signal may, under certain conditions (e.g., conditions of no or little chroma) provide a useful indication in the chroma frequency band of field comb quality.

The system 800 includes a field comb quality module 830. The field comb quality module 830 may share various characteristics with the field comb quality module 730 shown in FIG. 7 and discussed previously. The field comb quality module 830 also illustrates various additional aspects of the present invention. The field comb quality module 830 determines field comb quality based at least in-part on the signal indicative of inter-field signal difference substantially outside of the chroma frequency band, generated by the first difference generating module 810, and one or more various signals indicative of inter-field and/or inter-line signal difference substantially inside the chroma frequency band, generated by respective difference generating modules 810 and 820*a*-820*c*. Alternatively, the field comb quality module 830 may, for example, determine an estimate of field comb quality based on one or more signals indicative of differences substantially inside the chroma frequency band, generated by respective difference generating modules 820*a*-820*c*. The wide array of difference generating modules illustrated in FIG. 8 and their respective signals are merely illustrative, and accordingly, should by no means limit the scope of various aspects of the present invention to particular difference generating modules or groups thereof.

The exemplary field comb quality module 830 includes five absolute value circuits 831-835 utilized generally to determine respective magnitudes of various signals. The first absolute value circuit 834 is communicatively coupled to the first difference generating module 810. Accordingly, the first absolute value circuit 834 outputs the magnitude of the inter-field difference signal substantially outside of the chroma frequency band output from the first difference generating module 810. The second absolute value circuit 831 is communicatively coupled to the second difference generating module 820*a*. Accordingly, the second absolute value circuit 831 outputs the magnitude of the inter-field difference signal substantially inside of the chroma frequency band output from the second difference generating module 820*a*.

The third absolute value circuit 832 is communicatively coupled to the third difference generating module 820*b*. Accordingly, the third absolute value circuit 832 outputs the magnitude of the inter-field difference signal substantially inside of the chroma frequency band output from the third difference generating module 820*b*. The fourth absolute value circuit 833 is communicatively coupled to the fourth difference generating module 820*c*. Accordingly, the fourth absolute value circuit 833 outputs the magnitude of the inter-field difference signal substantially inside of the chroma frequency band output from the fourth difference generating module 820*c*. The fifth absolute value circuit 835 is communicatively coupled to the first BPF circuit 813 of the first difference generating module 810. Accordingly, the fifth absolute value circuit 835 outputs the magnitude of the inter-field difference signal substantially inside of the chroma frequency band output from the first difference generating module 810.

The field comb quality module 830 includes a minimum value detector module 836 communicatively coupled to the second, third, fourth and fifth absolute value circuits 831-833, 835. The minimum value detector module 836 determines the minimum value of the various magnitudes from the absolute value circuits 831-833, 835. In the illustrated example, each of the second, third, fourth and fifth absolute value circuits 831-833, 835 output a magnitude of a respective difference signal substantially inside of the chroma frequency band. The minimum value detector module 836 determines the minimum value of these various magnitudes and outputs a signal indicative of the determined minimum value. Subsequent circuitry may utilize this determined minimum value as an indication of field comb quality.

The system 800 includes a logic circuit 838 communicatively coupled to the first absolute value circuit 834 and the minimum value detector module 836. The logic circuit 838 may utilize the signals output from the first absolute value circuit 834 and the minimum value detector module 836 to determine a field comb quality indication. That is, the logic circuit 838 may, for example, determine a field comb quality indication based at least in-part on the magnitude of inter-field signal difference substantially outside the chroma frequency band, and the minimum magnitude of various magnitudes of inter-field differences substantially inside the chroma frequency band.

As an illustrative example, the logic circuit 838 may determine the field comb quality indication based at least in-part on a weighted average of the magnitude of inter-field difference substantially outside the chroma frequency band, and a minimum magnitude of various signals corresponding to signal difference substantially inside the chroma frequency band. By way of example, the logic circuit 838 may generate a first value by multiplying the magnitude of inter-field difference substantially outside the chroma frequency band by a first weighting factor, $P_f$. The logic circuit 838 may then generate a second value by multiplying the minimum magnitude of various signal difference indications substantially inside the chroma frequency band by a second weighting factor, $(1-P_f)$. The logic circuit 838 may then add the first value to the second value to obtain a raw field comb quality indication, which the logic circuit 838 may further tailor to a particular signal processing situation.

For example, the logic circuit 838 may perform a coring operation on the raw quality indication to eliminate relatively small values. The logic circuit 838 may, for example, clip the raw quality indication to set a maximum value. The logic circuit 838 may multiply the raw quality indication by a scaling factor to establish a general range of values. The logic circuit 838 may also, for example, low pass filter the raw quality indication to slow drastic changes in the raw quality indication. In general, the logic circuit 838 may perform a large variety of various numerical manipulation techniques to tailor the field comb quality indication to a particular signal processing situation.

The system 800 lastly includes a signal generator 840 communicatively coupled to the field comb quality module 830. The signal generator 840 generates a signal indicative of the field comb quality determined by the field comb quality module 830. Such a signal may include, for example, a signal indicative of the field comb quality, such as a digital or analog data signal. The signal generator 840 may provide the signal indicative of field comb quality to various downstream signal processing apparatus and systems. Such systems may include, for example, systems that make processing decisions regarding comb filtering. One such exemplary system, that generates a comb filtered signal, is illustrated in FIG. 9.

Figure 9:
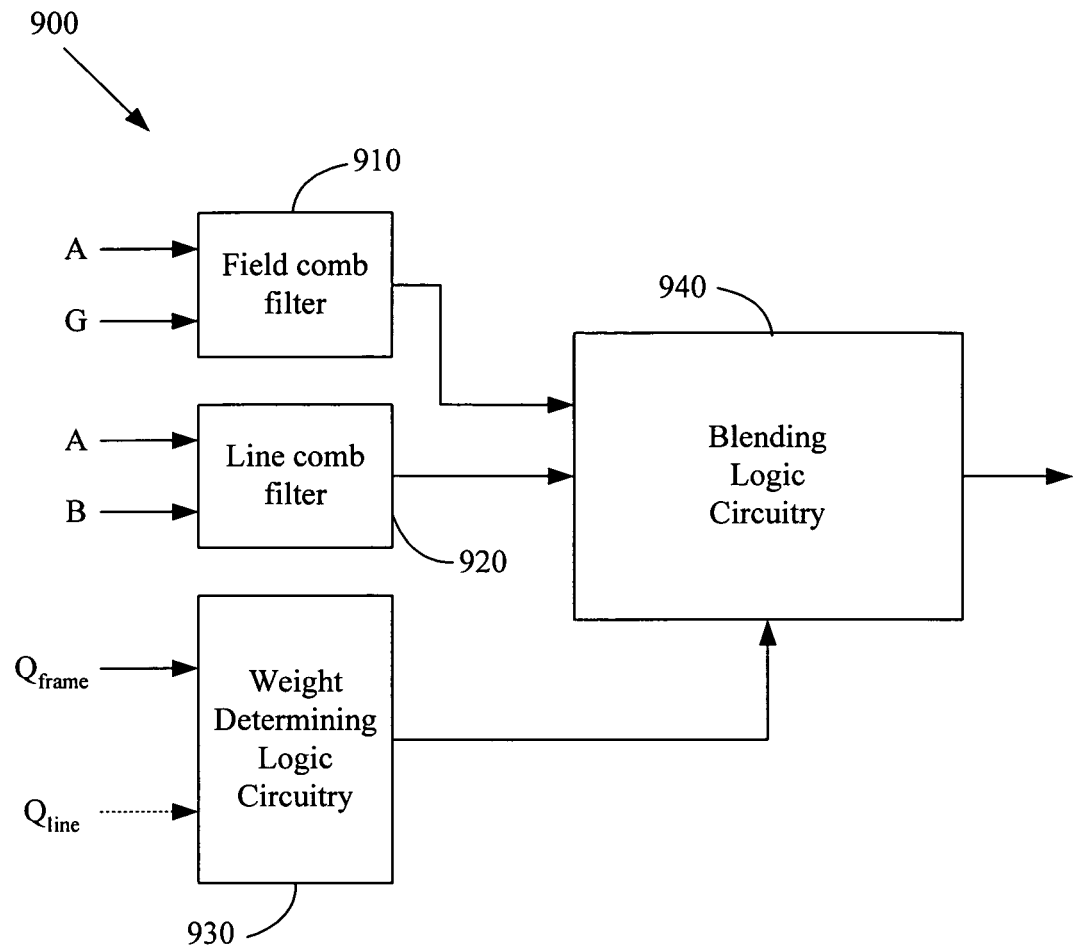
FIG. 9 is a diagram showing a system for generating a comb filtered signal, in accordance with various aspects of the present invention.

FIG. 9 is a diagram showing a system 900 for generating a comb filtered signal, in accordance with various aspects of the present invention. The system 900 includes a field comb filter 910 (or frame comb filter) and a line comb filter 920. The system 900 also includes a weight determining logic circuit 930 and blending logic circuit 940. The field comb filter 910 generates a field comb signal. For example, referring back to FIG. 1, the field comb filter 910 may generate a field comb signal by processing signals A and G. The line comb filter 920 generates a line comb signal. For example, the line comb filter 910 may generate a line comb signal by processing signals A and B. Note that the illustrated signals are merely exemplary and should by no means limit the scope of various aspects of the present invention to various signals or combinations of signals.

The weight determining logic circuit 930 may receive an indication of field comb quality. For example, the weight determining logic circuit 930 may receive a signal indicative of field comb quality from a system, such as the system 800 illustrated in FIG. 8 or the system 700 illustrated in FIG. 7. The weight determining logic circuit 930 may also optionally receive an indication of line comb quality. The weight determining logic circuit 930 may process the received field comb quality indication, and optionally a received line comb quality indication, to generate one or more weighting factors with desired minimum, maximum and range characteristics. For example the logic circuit 930 may generate a normalized field comb weighting factor and line comb weighting factor.

The blending logic circuit 940 is communicatively coupled to the field comb filter 910, line comb filter 920 and weight determining logic circuit 930. The blending logic circuit 940 may utilize field and/or line comb weighting factors received from the weight determining logic circuit 930 to determine relative portions of the field comb and line comb signals to combine to form a blended comb signal. For example, a field comb weighting factor may be 0.6 and a line comb weighting factor may be 0.4. The blending logic circuit 940 may then determine a blended comb signal as a weighted sum including the field comb signal from the field comb filter 910 multiplied by 0.6 and the line comb signal from the line comb filter 920 multiplied by 0.4. The blending logic circuit 940 may then provide the resulting blended comb signal to various downstream circuits and systems for subsequent processing.

The various system components, circuits and modules illustrated in FIGS. 7-9 and described previously may assume a multitude of forms. For example, various modules may be modules consisting of only hardware circuitry. Various other modules may include one or more processors executing software or firmware instructions. Various other modules may include combination of processing hardware and software. Accordingly, the scope of various aspects of the present invention should, by no means, be limited to particular hardware, software or hybrid configurations. Additionally, various systems and system components described previously may be integrated in a single integrated circuit or multiple integrated circuits. Such integrated circuits may be included in a multi-chip module or multi-chip card. Various systems and system components may also be configured as physically dispersed units in separate housings. Accordingly, the scope of various aspects of the present invention should, by no means, be limited to particular physical component configurations, embodiments and arrangements.

In summary, various aspects of the present invention provide a system and method for improved processing of comb filtered signals.

While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for generating a signal indicative of a quality of a current signal processed utilizing three-dimensional comb filtering, the current signal being from a current video line of a current video field, the method comprising:

generating a first signal indicative of inter-field and inter-line signal difference substantially inside a chroma frequency band;

determining a quality indication based at least in-part on the first signal; and
generating a quality signal indicative of the quality indication.

2. The method of claim 1, further comprising generating a second signal indicative of inter-field signal difference substantially outside the chroma frequency band, and wherein determining the quality indication comprises determining the quality indication based at least in-part on the first signal and the second signal.

3. The method of claim 1, wherein the first signal is indicative of inter-frame and inter-line signal difference substantially inside the chroma frequency band.

4. The method of claim 1, further comprising generating a second signal indicative of inter-field and inter-line signal difference substantially inside the chroma frequency band, wherein determining the quality indication comprises determining the quality indication based at least in-part on the first signal and the second signal.

5. The method of claim 4, wherein determining the quality indication further comprises: determining a magnitude of the first signal; determining a magnitude of the second signal; and determining the quality indication based at least in-part on a minimum of the magnitude of the first signal and the magnitude of the second signal.

6. The method of claim 1, further comprising generating a second signal indicative of inter-frame luma difference and inter-frame chroma difference, the second signal based on a first sample in the current video line of the current video field and a second sample in a second video line corresponding to the current video line in a second video field temporally displaced from the current video field, and wherein determining the quality indication comprises determining the quality indication based at least in-part on the first signal and second signal.

7. The method of claim 6, wherein the first sample in the current video line is horizontally displaced relative to the second sample in the second video line.

8. The method of claim 6, wherein determining the quality indication further comprises:
determining a magnitude of the first signal;
determining a magnitude of the second signal; and
determining the quality indication based at least in-part on a minimum of the magnitude of the first signal and the magnitude of the second signal.

9. The method of claim 1, further comprising generating an inter-frame chroma signal, wherein determining the quality indication comprises determining the quality indication based at least in-part on the first signal and the inter-frame chroma signal.

10. The method of claim 9, wherein determining the quality indication further comprises: determining a magnitude of the first signal; determining a magnitude of the inter-frame chroma signal; and determining the quality indication based at least in-part on a minimum of the magnitudes of the first signal and the inter-frame chroma signal.

11. The method of claim 2, wherein determining the quality indication comprises: determining a magnitude of the first signal; determining a magnitude of the second signal; and determining a weighted sum of the magnitude of the first signal and the magnitude of the second signal; wherein determining the quality indication comprises determining the quality indication based at least in-part on the weighted sum.

12. The method of claim 1, wherein generating the first signal comprises determining a difference between a sample in a video line of the current video field and a second sample in a video line of a second video field, the video line of the second video field being vertically displaced from the video line of the current video field, and the second video field being temporally displaced from the current video field by an even number of video fields.

13. A system for generating a signal indicative of a quality of a current signal processed utilizing three-dimensional comb filtering, the current signal being from a current video line of a current video field, the system comprising:
a first module that generates a first signal indicative of inter-field and inter-line signal difference substantially inside a chroma frequency band;
a second module, communicatively coupled to the first module, that determines a field comb quality based at least in-part on the first signal; and
a third module, communicatively coupled to the second module, that generates a signal indicative of the field comb quality.

14. The system of claim 13, further comprising a fourth module, communicatively coupled to the second module, that generates a second signal indicative of inter-field signal difference substantially outside the chroma frequency band, wherein the second module determines the field comb quality based at least in-part on the first signal and the second signal.

15. The system of claim 13, further comprising a fourth module, communicatively coupled to the second module, that generates a second signal indicative of inter-field and inter-line signal difference substantially inside the chroma frequency band, and wherein the second module determines the field comb quality based at least in-part on the first signal and the second signal.

16. The system of claim 15, wherein the second module comprises:
a first magnitude-determining module, communicatively coupled to the first module that outputs a signal indicative of a magnitude of the first signal;
a second magnitude-determining module, communicatively coupled to the second module, that outputs a signal indicative of a magnitude of the second signal;
a minimum-determining module, communicatively coupled to the first and second magnitude-determining modules, that outputs a signal indicative of a minimum of a group of signals, the group of signals comprising:
the signal indicative of the magnitude of the first signal and the signal indicative of the magnitude of the second signal; and
a quality-determining module, communicatively coupled to the minimum-determining module, that determines the field comb quality based at least in-part on the signal indicative of the minimum of the group of signals.

17. The system of claim 13, further comprising a fourth module, communicatively coupled to the second module, that generates a second signal indicative of inter-field luma difference and inter-field chroma difference, the second signal based at least in-part on a first sample in the current video line of the current video field and a second sample in a second video line corresponding to the current video line in a second video field temporally displaced from the current video field, and wherein the second module determines the field comb quality based at least in-part on the first signal and the second signal.

18. The system of claim 13, further comprising a fourth module, communicatively coupled to the second module, that generates an inter-frame chroma signal, and wherein the second module determines the field comb quality based at least in-part on the first signal and the inter-frame chroma signal.

19. The system of claim 14, wherein the second module comprises:

a first magnitude-determining module, communicatively coupled to the first module, that outputs a signal indicative of a magnitude of the first signal;

a second magnitude-determining module, communicatively coupled to the fourth module, that outputs a signal indicative of a magnitude of the second signal; a-Rd a weight-determining module, communicatively coupled to the first and second magnitude-determining modules, that determines a weighted sum based at least in-part on the signal indicative of the magnitude of the first signal and the signal indicative of the magnitude of the second signal; and a quality-determining module, communicatively coupled to the weight-determining module, that determines an indication of the field comb quality based at least in-part on the weighted sum.

20. The system of claim 13, wherein the first module determines a difference between a sample in a video line of the current video field and a second sample in a video line of a second video field, the video line of the second video field being vertically displaced from the video line of the current video field, and the second video field being temporally displaced from the current video field by an even number of field intervals.

* * * * *